US008187157B2

(12) United States Patent
Thiem et al.

(10) Patent No.: US 8,187,157 B2
(45) Date of Patent: May 29, 2012

(54) MICROTOME BLADE CHANGING APPARATUS FOR A KNIFE HOLDER OF A MICROTOME, AND MICROTOME

(75) Inventors: Stefan Thiem, Heidelberg (DE); Rolf Metzner, Überlingen (DE); Christoph Schmitt, Schriesheim (DE)

(73) Assignee: Leica Biosystems Nussloch GmbH, Nussloch (DE)

(*) Notice: Subject to any disclaimer, the term of this patent is extended or adjusted under 35 U.S.C. 154(b) by 1195 days.

(21) Appl. No.: 11/960,001

(22) Filed: Dec. 19, 2007

(65) Prior Publication Data

US 2008/0148918 A1 Jun. 26, 2008

(30) Foreign Application Priority Data

Dec. 21, 2006 (DE) ......................... 10 2006 061 809
Feb. 7, 2007 (DE) ......................... 10 2007 006 826

(51) Int. Cl.
*B23Q 3/155* (2006.01)
*G01N 1/06* (2006.01)

(52) U.S. Cl. ............. 483/16; 83/703; 83/707; 83/915.5; 83/954

(58) Field of Classification Search .................... 483/16, 483/2–3, 28–29; 83/915.5, 703, 707, 954
See application file for complete search history.

(56) References Cited

U.S. PATENT DOCUMENTS 2,679,685 A * 6/1954 Austin ........................... 30/40.2
3,699,830 A 10/1972 Pickett
4,207,790 A 6/1980 Endo
4,700,600 A 10/1987 Pickett
5,937,522 A 8/1999 Althaus et al.
6,763,972 B2 7/2004 Graupner
7,146,894 B2 * 12/2006 Hendrick et al. ............... 83/703
2002/0005104 A1 1/2002 Hendrick et al.
2003/0015545 A1 1/2003 Graupner
2006/0272467 A1 * 12/2006 Hendrick et al. ............... 83/730
2008/0202308 A1 * 8/2008 Fujiwara et al. ................ 83/703

FOREIGN PATENT DOCUMENTS

DE 10 2004 051 974 A1 4/2006
JP 2000 62869 A 2/2000
JP 2010-054483 A * 3/2010

* cited by examiner

*Primary Examiner* — Erica E Cadugan
(74) *Attorney, Agent, or Firm* — Hodgson Russ LLP

(57) ABSTRACT

A microtome blade changing apparatus for a knife holder (1) of a microtome comprises a blade dispenser (4) storing unused blades and a blade container (5) for receiving used blades. The blade dispenser (4) and blade container (5) are respectively arranged adjacent to the knife holder (1). To reduce the risk of injury to an operator in the context of a blade changing operation, enable operation of the microtome blade changing apparatus reliably and in simple fashion, and allow economical manufacture of the microtome blade changing apparatus, the microtome blade changing apparatus is characterized in that an entraining element (13) manually actuable by an operator is provided, and is configured in such a way that an unused blade is transferable with the entraining element (13) from the blade dispenser (4) to the knife holder (1), and a used blade is thereby conveyable into the blade container (5).

19 Claims, 9 Drawing Sheets

Microtome Blade Changing Apparatus Including at Least One guidance Element Including a Rod

Fig. 8

Sliding, Rotary, or Rotary-Disc Microtome, including a Microtome Housing to which the Knife Holder is Attached

Fig. 9

MICROTOME BLADE CHANGING APPARATUS FOR A KNIFE HOLDER OF A MICROTOME, AND MICROTOME

CROSS REFERENCE TO RELATED APPLICATIONS

This application claims priority of German patent application no. 10 2006 061 809.2 filed Dec. 21, 2006, and German patent application no. 10 2007 006 826.5 filed Feb. 7, 2007, both such applications being incorporated by reference herein.

FIELD OF THE INVENTION

The present invention relates to a microtome blade changing apparatus for a knife holder of a microtome. The microtome blade changing apparatus comprises a blade dispenser and a blade container. Multiple blades are provided in the blade dispenser. The blades provided in the blade dispenser are, in particular, unused, and are used or consumed for sectioning procedures using the microtome. The blade container serves to receive or collect used blades. The blade dispenser and blade container are respectively arranged adjacent to the knife holder or adjacent to the blade position of a blade that is in sectioning operation. The present invention further relates to a microtome having a microtome blade changing apparatus.

BACKGROUND OF THE INVENTION

"Blades" in this context are thin single-use blades that are clamped or secured in the knife holder of the microtome, and are disposed of after use. The unused blades can be arranged in a blade dispenser such as the one shown and described, for example, in DE 201 11 599 U1, DE 28 52 373 C2, U.S. Pat. No. 4,700,600 or JP 2000-062 869 A. The blades can be brought directly out of the blade dispenser into the receptacle of the blade holder or knife holder. Used blades can be collected in a separate chamber inside the dispenser or in a blade container such as the one provided, for example, in the context of DE 28 52 373 C2.

Because the blades must be grasped upon transfer into the blade container, a danger of injury to the operator exists. Because used blades are often soiled with contaminated material, the operator is thereby also exposed to health risks.

DE 10 2004 051 974 A1 discloses a knife holder for such blades that comprises an ejection apparatus for the blades. The blade can be safely pushed out of the sectioning position, but the problem still exists that the blade must be grasped.

DE 601 08 952 T2 discloses a knife holder for single-use blades that comprises an automatic blade changing apparatus. For this purpose, there is arranged on the knife holder a blade dispenser from which a blade can be automatically pushed out and brought into a sectioning position. A used blade is pushed out of the sectioning area by a blade that has just been delivered, and is collected in a so-called waste cartridge (e.g. a blade container). The entire conveying mechanism is motor-controlled, and is correspondingly complex and (in some circumstances) subject to malfunction.

SUMMARY OF THE INVENTION

It is therefore the object of the present invention to describe and further develop a microtome blade changing apparatus and a microtome of the kinds cited above, with which the danger of injury to an operator in the context of a blade changing procedure can be further reduced, which enable operation in a reliable and simple fashion, and which can also, in particular, be manufactured economically.

The microtome blade changing apparatus according to the present invention achieves the aforesaid object. According to the invention, a microtome blade changing apparatus is characterized in that an entraining element manually actuable by an operator is provided, and is configured in such a way that a blade is transferable with the entraining element from or out of the blade dispenser to the knife holder, and a used blade is thereby transferable from the knife holder into the blade container. The entraining element is arranged on a locking rod for the knife holder and the entraining element is movable or transferable with the locking rod of the knife holder for the entraining motion of the blade along an entrainment path.

What has been recognized according to the present invention is firstly that a microtome blade changing apparatus operates very particularly reliably especially when it is embodied in manually actuable fashion. As a result, motorized drives and control units to be provided therefor can be omitted (at least for the part of the microtome that has to do with the microtome blade changing apparatus), thus decreasing the manufacturing costs of the microtome blade changing apparatus and of the microtome. In addition, sectioned material cannot get onto or into the motorized drives (which are not provided) or a conversion linkage or actuation mechanism that may be provided, and jam and ultimately damage them. In an additionally advantageous fashion, the danger of injury to the operator in the context of a blade changing procedure is thereby also reduced if not entirely eliminated, because the operator need no longer grasp the blades at all during the changing procedure.

According to a preferred embodiment, the entraining element is guided for its entraining motion by means of at least one guidance element. The guidance element may comprise for this purpose at least one rod and/or at least one sliding surface and/or at least one support surface. It is conceivable for the rod to be arranged in stationary fashion on the housing, and for the entraining element to move relative to the rod. Alternatively, the rod could also move along with the entraining element in the context of the entraining motion; in this case the rod could be suitably guided or mounted by a housing part.

For example, the entraining element may be movable along a rod arranged in stationary fashion and/or along a housing part of the microtome, in which context an operator could operate or move the entraining element with the aid of a lever provided on the entraining element.

According to a very particularly preferred embodiment, the entraining element is arranged on a rod that is arranged movably along the direction of its longitudinal axis. The motion direction is oriented substantially parallel to the blade edge of a blade clamped in the knife holder. The rod could, for execution of the motion, be suitably guided or mounted by a housing part. A ball bearing and/or at least one plain bearing is conceivable for this purpose. The entraining element would thus be arranged substantially at a stationary position on the rod (relative to the longitudinal direction of the rod). The entraining element plus rod is thus moved in the direction of its longitudinal axis by the operator. The entraining element is correspondingly moved from the blade dispenser in the direction of the blade container. The motion of the rod is guided on a bearing or a guide, which could be arranged on the housing part of the microtome.

Concretely, the entraining element could execute a substantially rectilinear or linearly directed motion. This can be implemented, for example, by way of a rectilinearly configured rod and/or a support surface or sliding surface of substantially planar configuration. Also conceivable in principle, however, would be a motion of the entraining element along a circular segment or a curved entrainment path, corresponding guidance means for the entraining element then being provided.

According to a preferred embodiment, the rod is arranged rotatably with respect to the entraining element and/or to the housing of the microtome. As a result, a further function can be assigned to, for example, the rod and/or the entraining element.

One such further function could be, for example, an immobilizing mechanism of the knife holder that is actuable using the rod. For example, a pressure plate of the knife holder could be pressable by the rod against a retainer, so that a blade can be secured in the knife holder. The rod could comprise for this purpose an eccentrically configured region (e.g. having a gate) that, with the pressure plate in a suitable rotational position, presses the pressure plate of the knife holder against a retainer. A securing action of this kind is usually performed reversibly. For example, the rod could comprise an eccentric region that, for locking and unlocking, coacts with an attachment piece of the pressure plate upon a rotation of the rod about its longitudinal axis.

The entraining element is arranged on a locking rod or securing rod for the knife holder and the entraining element is movable or transferable with the locking rod of the knife holder for the entraining motion of the blade along a path. For example, a conventional knife holder provided for a microtome, including a conventional locking mechanism, which is lockable and unlockable by means of a locking rod, could be configured with a slight modification to yield a microtome blade changing apparatus according to the present invention. For this purpose, an entraining element must be provided, and arranged on the locking rod. The locking rod plus entraining element must be able to execute a motion along the longitudinal direction of the locking rod. A suitable arrangement of the blade dispenser, the knife holder, and the blade container is a prerequisite.

The entraining element could be configured and arranged in such a way that at least one region of the entraining element is engageable with a blade present in the blade dispenser, and said blade is transferable from or out of the blade dispenser and to the knife holder. Alternatively, a further component could also be provided, with which the blade is transferred out of the blade dispenser and onto which the entraining element engages. In the latter case, the entraining element engages onto the blade indirectly.

In very particularly preferred fashion, the blade dispenser, knife holder and blade container are arranged in such a way that the blade delivered from or out of the blade dispenser transfers the blade present in the knife holder, by way of the entraining action, from the knife holder into the blade container.

In principle, the entraining element could be actuable by an operator in entirely manual fashion, i.e. not in motorized fashion. The entraining element is accordingly actuable in entirely mechanical fashion and is guided in its motion by mechanical guidance means, and by conversion means or multiplication (leverage) means that are optionally provided.

The invention also covers a microtome characterized by a microtome blade changing apparatus as described herein. The microtome itself could be configured in the form of a sliding, rotary, or rotary-disc microtome.

There are various ways of advantageously embodying and refining the teaching of the present invention. The reader is referred, for that purpose, to the explanation below of the preferred exemplifying embodiments of the invention with reference to the drawings. In conjunction with the explanation of the preferred exemplifying embodiments of the invention with reference to the drawings, an explanation is also given of generally preferred embodiments and refinements of the teaching.

BRIEF DESCRIPTION OF THE DRAWING FIGURES

In the drawings:

FIG. 1 schematically depicts, in a perspective view, an exemplifying embodiment of a microtome blade changing apparatus according to the present invention;

Figure 1:
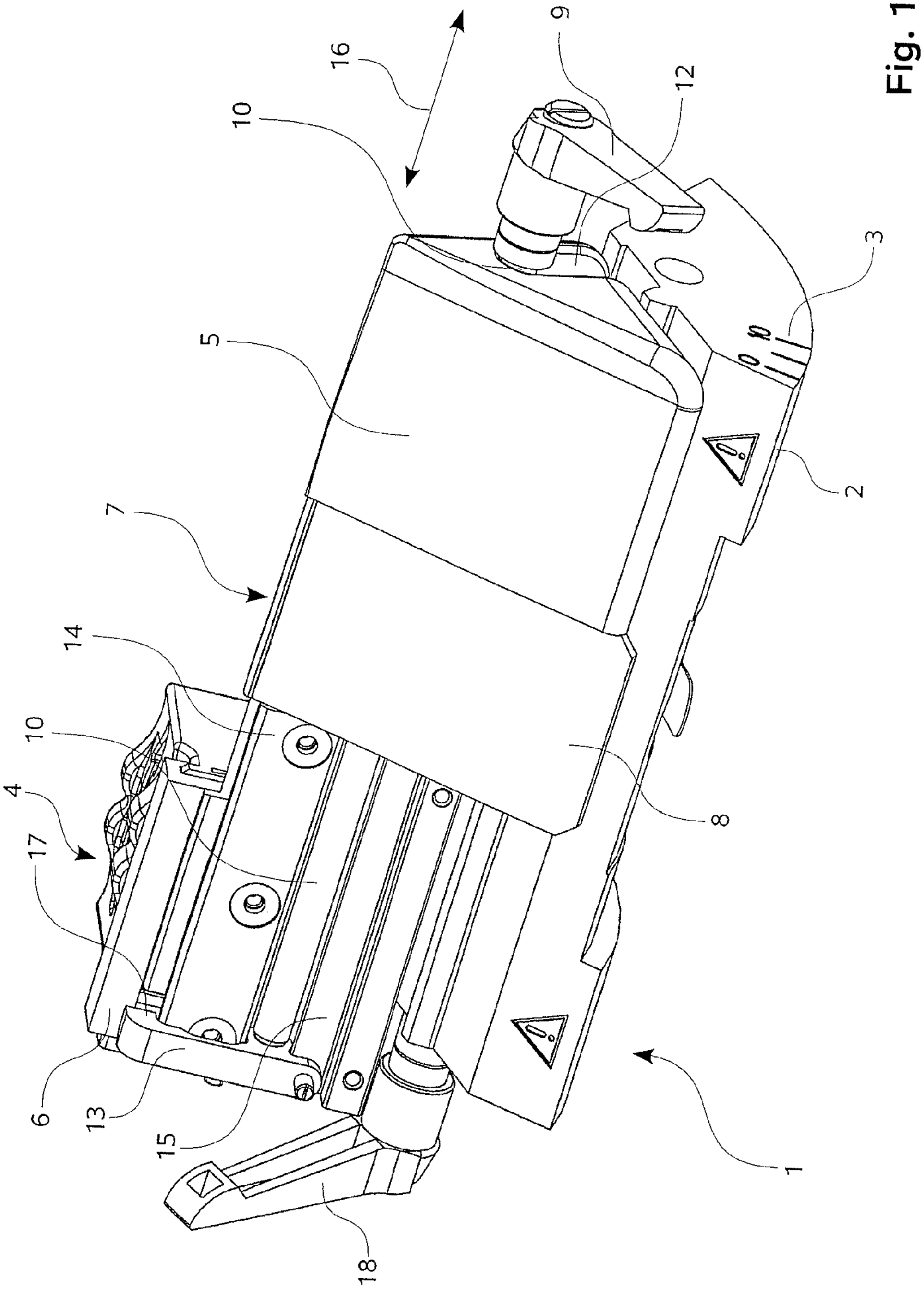

FIGS. 4 through 7 each show the microtome blade changing apparatus of FIG. 1 in a view comparable therewith, although individual components are shown in section or are partly or entirely removed;

FIG. 8 shows a schematic representation of an embodiment wherein the at least one guidance element includes a rod; and FIG. 9 shows a schematic representation of various types of microtomes.

DETAILED DESCRIPTION OF THE INVENTION

In the Figures, identical or similar components are labeled with the same reference characters.

Figure 2:
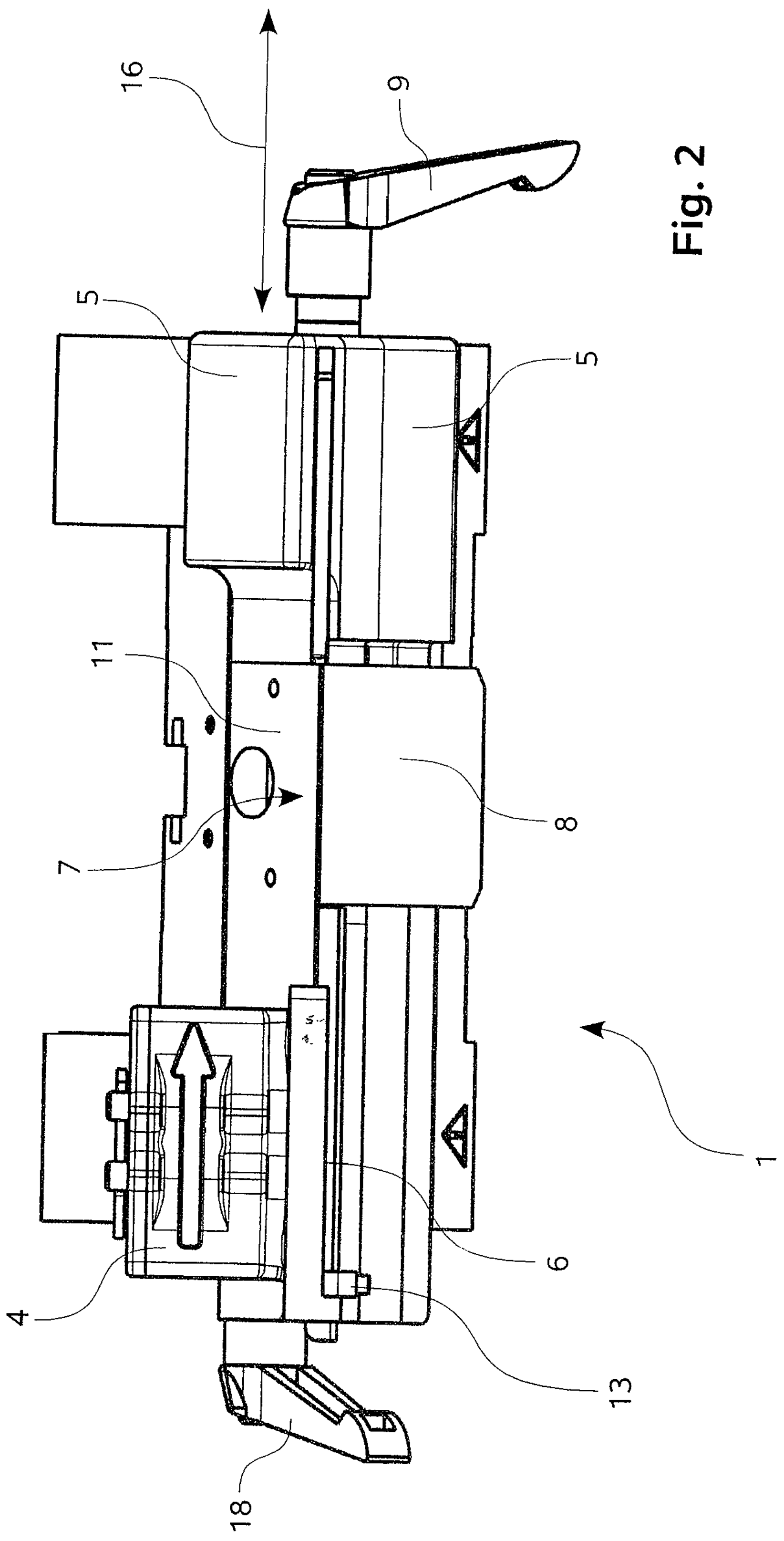
FIG. 2 is a plan view of the microtome blade changing apparatus of FIG. 1.
Figure 3:
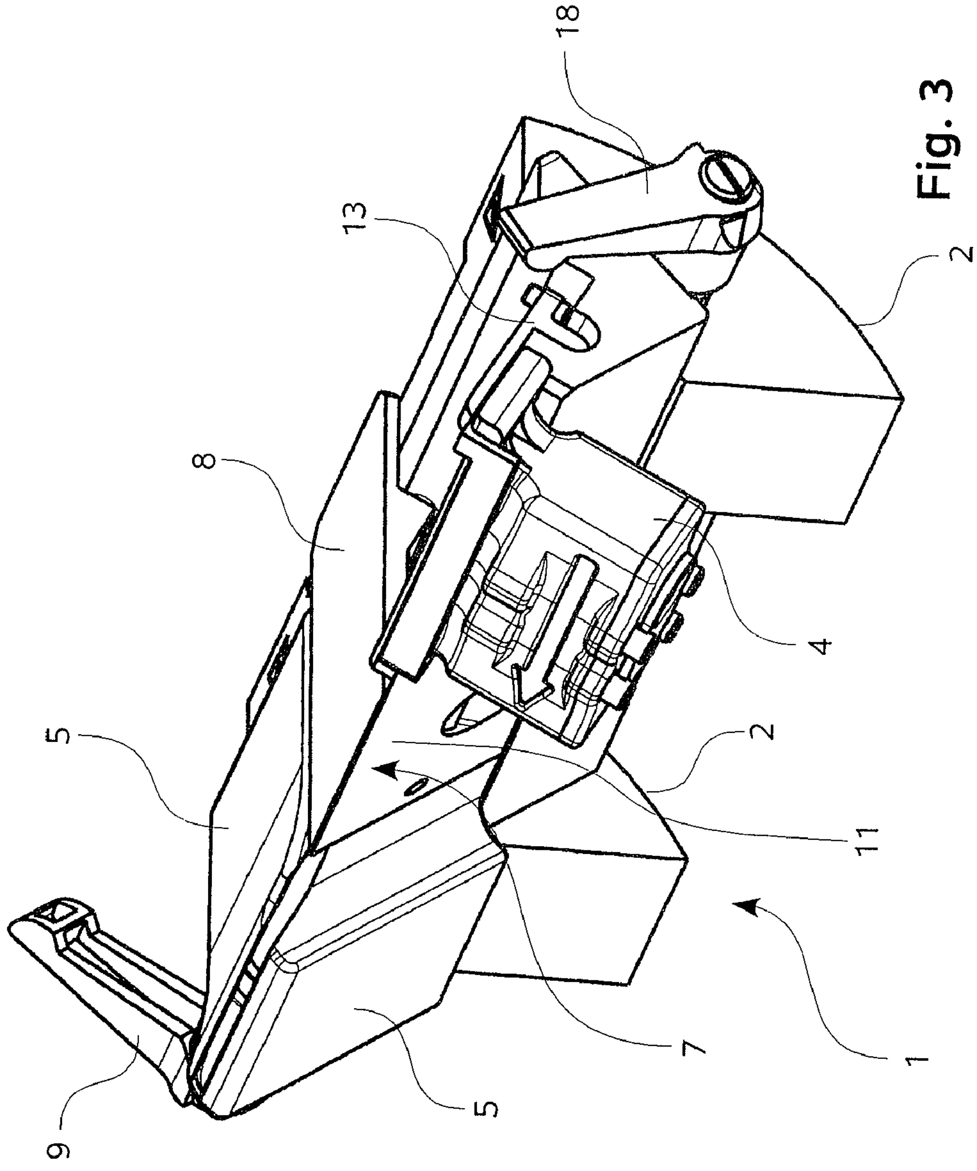
FIG. 3 is a perspective rear view of the microtome blade changing apparatus of FIG. 1.

FIGS. 1 to 3 show a knife holder 1 for microtome blades. Knife holder 1 considered of itself is configured comparably to the knife holder known from DE 10 2004 051 974 A1. Segment base 2 can be pivotably mounted on a base (not shown in FIGS. 1 to 3) of a microtome, with the result that the so-called relief angle, i.e. the orientation of the blade clamped in knife holder 1 relative to the specimen being sectioned (not shown), is adjustable. Corresponding angle markings 3 are also provided for this purpose in the front region of the one end face. The relative position between segment base 2 and the base can be secured with rotary lever 18. Knife holder 1 shown in FIGS. 1 to 3 could be installed on a rotary microtome such as the one known, for example, from DE 10 2004 004 355 B3 and its counterpart US 2004/261597 A1, the disclosure of which is incorporated herein by reference.

Knife holder 1 comprises a microtome blade changing apparatus having a blade dispenser 4 and a blade container 5. Multiple unused blades with which the specimens are ultimately sectioned are provided in blade dispenser 4. The blades (not shown explicitly in FIGS. 1 to 3) are preloaded with a spring in blade dispenser 4 so that they are pushed toward front surface 6 of blade dispenser 4. Blade container 5 serves to receive used blades. As depicted in FIG. 1, blade dispenser 4 is arranged to the left of, alongside and therefore adjacent to, knife holder 1. As depicted in FIG. 1, blade container 5 is arranged to the right of, alongside and therefore adjacent to, knife holder 1. The adjacent arrangement of blade dispenser 4 and blade container 5 refers in particular to blade position 7 of knife holder 1, in which position the blades provided for a sectioning operation are located during operation of the microtome.

Knife holder 1 comprises a pressure plate 8 that can be pushed with rotary lever 9, in coaction with locking rod 10, against the base element or retainer 11. As a result, a blade (not shown) located between pressure plate 8 and retainer 11 can be immobilized or secured in the sectioning position. This is achieved by the fact that locking rod 10 is mounted rotatably about its longitudinal axis and comprises on locking rod 10, in the region of pressure plate 8, an eccentric-shaped component that, upon rotation of rotary lever 9 joined nonrotatably to locking rod 10, presses pressure plate 8 toward retainer 11 or moves pressure plate 8 away from retainer 11 or releases it. Locking rod 10 thus forms, together with pressure plate 8, retainer 11, and rotary lever 9, an immobilization mechanism for a blade.

Figure 4:
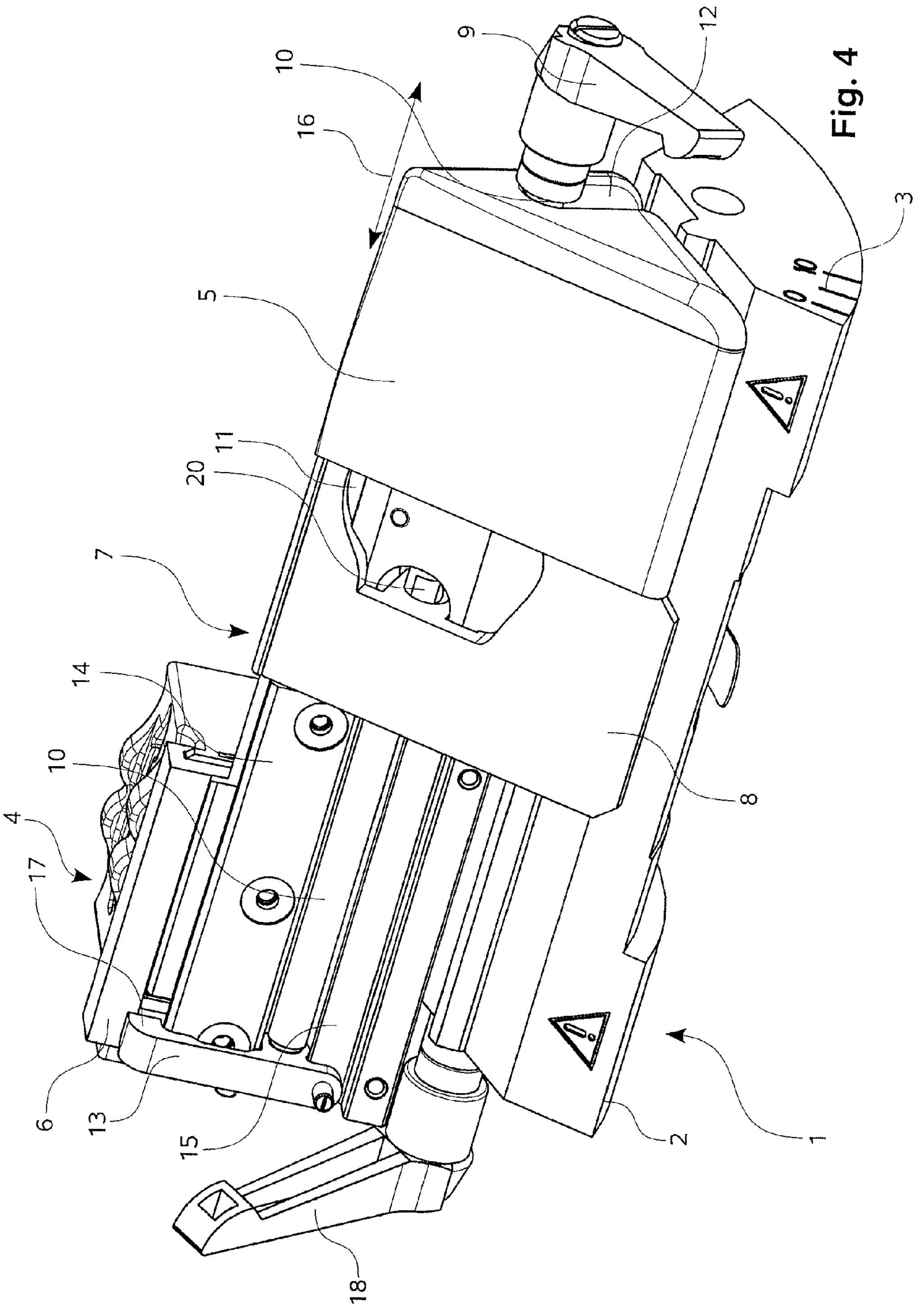
Figure 5:
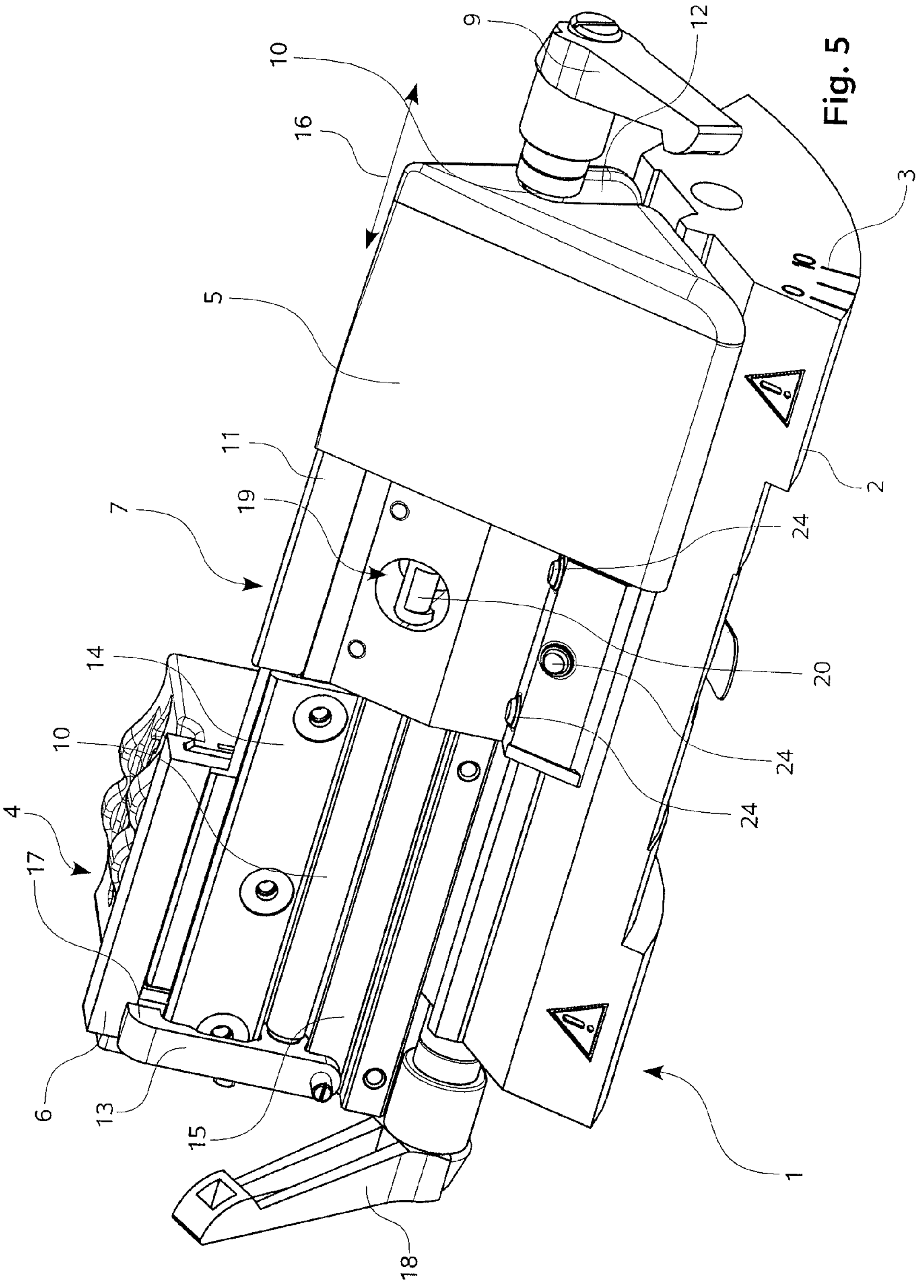
Figure 6:
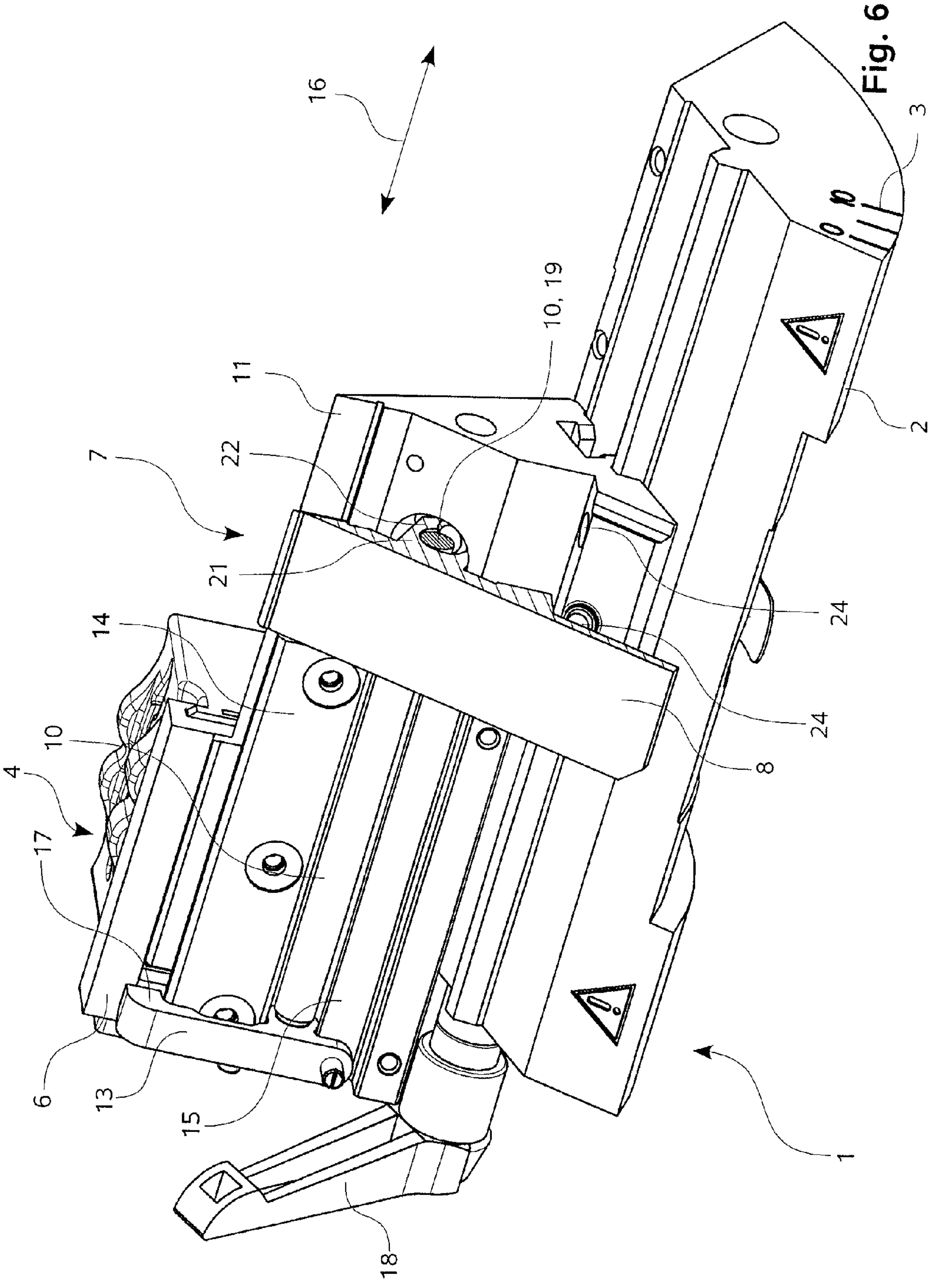
Figure 7:
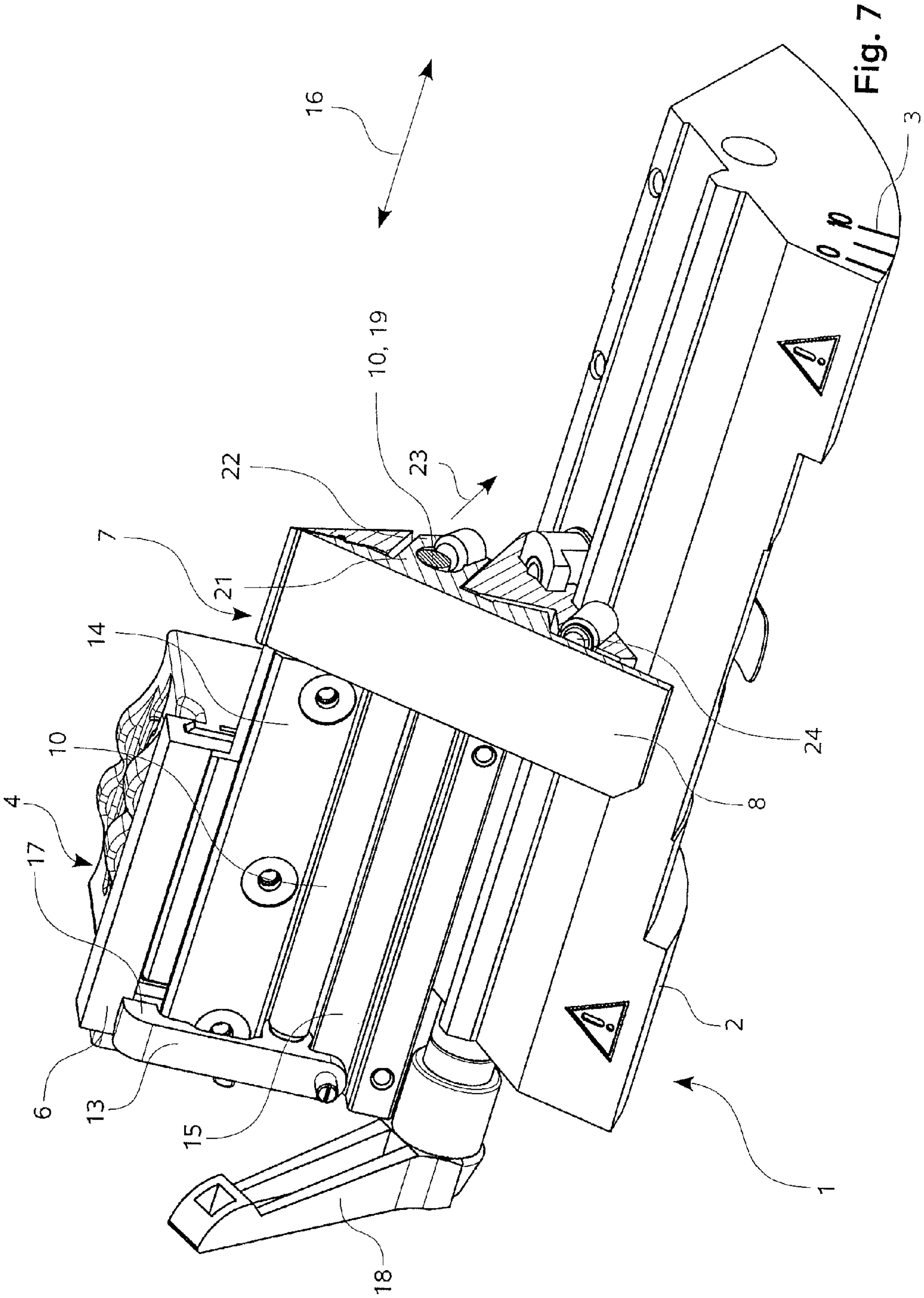

The immobilization mechanism for a blade is shown in further detail in FIGS. 4 to 7. FIGS. 4 to 7 each show the microtome blade changing apparatus of FIG. 1 in a view comparable to FIG. 1. FIG. 4 shows pressure plate 8 in partly sectioned fashion. In FIG. 5, pressure plate 8 has been entirely removed. FIGS. 6 and 7 show only the left part of pressure plate 8. In FIGS. 6 and 7, both blade container 5 and the right part of the entire knife holder 1, along with rotary lever 9 and the right part of locking rod 10, have been removed from the drawing. Locking rod 10 comprises on eccentric region 19 an opening 20 that exhibits an increasing and decreasing radius (in the manner of a gate) in a circumferential direction of locking rod 10. Eccentric region 19 and opening 20 come into engagement with attachment piece 21 of pressure plate 8 if locking rod 10 is correspondingly rotated. It is apparent from FIG. 7 that attachment piece 21 comprises a projection 22 against which eccentric region 19 of locking rod 10 abuts. If eccentric region 19 is in a corresponding angular position, eccentric region 19 pushes projection 22 in the direction of the arrow labeled with reference character 23. As a result, pressure plate 8 (mounted on the three support points 24) is pressed with its upper region against retainer 11, so that a blade (not shown in the Figures) can be secured in blade position 7 between pressure plate 8 and retainer 11. By a rotation of lever 9, and thus of locking rod 10, in the corresponding other direction, pressure plate 8 is released in the direction opposite to arrow 23, so that a blade can be transferred out of blade dispenser 4 into blade position 7 and/or a blade that is in blade position 7 can be transferred into blade container 5.

Blade container 5 comprises an opening 12 that extends in the longitudinal direction of locking rod 10. Opening 12 allows blade container 5 to be placed over locking rod 10 from above, and thus arranged reversibly or replaceably on knife holder 1.

An entraining element 13 manually actuable by an operator is provided according to the present invention, and is configured so that with entraining element 13, a blade is transferable out of blade dispenser 4 to knife holder 1 or into blade position 7, and a used blade is thereby conveyable into blade container 5.

Entraining element 13 is guided for its entraining motion by means of two guidance elements 14 and 15. Guidance elements 14 and 15 each comprise a support surface or sliding surface. Entraining element 13 is thus arranged on locking rod 10.

Locking rod 10 is arranged movably about its longitudinal axis in a direction 16 that is oriented substantially parallel to a blade edge, the associated blade being immobilized in blade position 7 between pressure plate 8 and retainer 11 in knife holder 1. Because entraining element 13 is arranged at a stationary position on locking rod 10, the entraining element plus locking rod 10 can be moved by the operator in direction 16 of the longitudinal axis of locking rod 10 by moving lever 9 to the right or left (in terms of the view of knife holder 1 according to FIG. 2). Entraining element 13 is correspondingly moved from blade dispenser 4 toward blade container 5. The motion of locking rod 10 is guided by a guide or bearing (not shown in FIGS. 1 to 3) arranged on knife holder 1. Entraining element 13 thus executes a substantially linearly directed or rectilinear motion in direction 16. Because the entraining element abuts against sliding surfaces 14, 15 and is thus not arranged rotatably with respect to knife holder 1, entraining element 13 is arranged rotatably with respect to locking rod 10.

Entraining element 13 is embodied, and is arranged on knife holder 1, in such a way that a region 17 of entraining element 13 is engageable with a blade present in blade dispenser 4. With region 17 of entraining element 13, the blade is transferable from blade dispenser 4 to knife holder 1 or to blade position 7.

Blade dispenser 4, knife holder 1, and blade container 5 are arranged in such a way that the blade conveyed out of blade dispenser 4 transfers, by way of the entraining action of entraining element 13, the (used or exhausted) blade present in knife holder 1 and in blade position 7 from knife holder 1 into blade container 5.

Entraining element 13 is actuable by an operator only manually, i.e. not in motorized fashion. In other words, the microtome blade changing apparatus is notable for the fact that no motorized drives are provided, and blade changing takes place via the rotatably mounted tie rod or locking rod 10.

In conclusion, be it noted very particularly that the exemplifying embodiments discussed above serve merely to describe the teaching claimed, but do not limit it to the exemplifying embodiments.

PARTS LIST

1 Knife holder
2 Segment base of (1)
3 Angle marking
4 Blade dispenser
5 Blade container
6 Front surface of (4)
7 Blade position of (1)
8 Pressure plate
9 Rotary lever
10 Locking rod
11 Retainer
12 Opening of (5)
13 Entraining element
14 Upper guidance element in the form of a sliding surface
15 Lower guidance element in the form of a sliding surface
16 Motion direction of (10, 13)
17 Region of (13) that is engageable with a blade from (4)
18 Rotary lever
19 Eccentric-shaped region of (10)
20 Opening
21 Attachment piece
22 Projection of (21) on (8), which coacts with (19)
23 Arrow
24 Support point for (8)

What is claimed is:

1. A microtome blade changing apparatus for a knife holder (1) of a microtome, the knife holder having a locking rod operable for releasably immobilizing a blade in a sectioning position, the blade changing apparatus comprising:

a blade dispenser (4) adjacent the knife holder for holding unused blades;

a blade container (5) adjacent the knife holder for receiving used blades; and an entraining element (13) arranged on the locking rod of the knife holder for movement with the locking rod relative to the blade dispenser along an entrainment path, the entraining element being manually actuable along the entrainment path by an operator to transfer an unused blade from the blade dispenser to the knife holder and convey the used blade into the blade container.

2. The microtome blade changing apparatus according to claim 1, further comprising at least one guidance element engaged by the entraining element for guiding motion of the entraining element along the entrainment path.

3. The microtome blade changing apparatus according to claim 2, wherein the at least one guidance element includes a rod.

4. The microtome blade changing apparatus according to claim 2, wherein the at least one guidance element includes a support surface.

5. The microtome blade changing apparatus according to claim 2, wherein the at least one guidance element includes a sliding surface.

6. The microtome blade changing apparatus according to claim 1, wherein the entraining element is connected to a lever and is movable along a stationary part by operation of the lever.

7. The microtome blade changing apparatus according to claim 1, wherein the entraining element and locking rod are movable along a longitudinal axis of the locking rod, and the longitudinal axis of the locking rod is oriented substantially parallel to an edge of a blade held by the knife holder.

8. The microtome blade changing apparatus according to claim 7, wherein the entraining element and locking rod are moved along the longitudinal axis of the locking rod in a direction from the blade dispenser toward the blade container to transfer an unused blade from the blade dispenser to the knife holder.

9. The microtome blade changing apparatus according to claim 1, wherein the entrainment path is substantially rectilinear.

10. The microtome blade changing apparatus according to claim 1, wherein the locking rod is rotatable about its longitudinal axis relative to the entraining element.

11. The microtome blade changing apparatus according to claim 1, wherein the entraining element includes a region which engages the unused blade during transfer of the unused blade from the blade dispenser to the knife holder.

12. The microtome blade changing apparatus according to one of claim 1, wherein the blade dispenser and blade container are arranged with respect to the knife holder such that the unused blade delivered out of the blade dispenser engages the used blade present in the knife holder to convey the used blade from the knife holder to the blade container.

13. The microtome blade changing apparatus according to claim 1, wherein the entraining element is actuable by an operator only manually.

14. A knife holder assembly for a microtome, the knife holder assembly comprising:

a knife holder including an immobilizing mechanism for releasably immobilizing a blade in a sectioning position and a locking rod connected to the immobilizing mechanism;

a blade dispenser (4) adjacent the knife holder for holding unused blades;

a blade container (5) adjacent the knife holder for receiving used blades; and an entraining element (13) arranged on the locking rod of the knife holder for movement with the locking rod relative to the blade dispenser along an entrainment path, the entraining element being manually actuable along the entrainment path by an operator to transfer an unused blade from the blade dispenser to the knife holder and convey the used blade into the blade container.

15. The knife holder assembly according to claim 14, wherein the immobilizing mechanism of the knife holder includes a pressure plate for pressing against the blade, wherein the locking rod is operable to push against the pressure plate to cause the pressure plate to press against the blade to thereby immobilize the blade, and wherein the entraining element is arranged on the locking rod of the knife holder for movement with the locking rod along the entrainment path.

16. The knife holder assembly according to claim 15, wherein the locking rod has an eccentric region coacting with an attachment piece of the pressure plate upon rotation of the locking rod.

17. A microtome comprising:

a microtome housing;

a knife holder mounted on the microtome housing for adjustment relative thereto, the knife holder including a locking rod operable for releasably immobilizing a blade in a sectioning position;

a blade dispenser (4) adjacent the knife holder for holding unused blades;

a blade container (5) adjacent the knife holder for receiving used blades; and an entraining element (13) arranged on the locking rod of the knife holder for movement with the locking rod relative to the blade dispenser along an entrainment path, the entraining element being manually actuable along the entrainment path by an operator to transfer an unused blade from the blade dispenser to the knife holder and convey the used blade into the blade container.

18. The microtome according to claim 17, wherein the microtome is selected from the group consisting of a sliding microtome, a rotary microtome, and a rotary-disc microtome.

19. The microtome according to claim 18, wherein the motion of the locking rod is guided on a bearing or a guide arranged on the microtome housing.

* * * * *